United States Patent [19]

Flanigan

[11] Patent Number: 5,492,561
[45] Date of Patent: Feb. 20, 1996

[54] PROCESS FOR LIQUEFYING TIRE RUBBER AND PRODUCT THEREOF

[75] Inventor: Theodore P. Flanigan, League City, Tex.

[73] Assignee: Neste/Wright Asphalt Products, Co., Channelview, Tex.

[21] Appl. No.: 418,352

[22] Filed: Apr. 7, 1995

[51] Int. Cl.$^6$ .................................................. C09D 195/00
[52] U.S. Cl. .................................... 106/273.1; 106/281.1; 524/59; 524/64
[58] Field of Search ........................... 106/273.1, 281.1; 524/59, 64

[56] References Cited

U.S. PATENT DOCUMENTS

| | | | |
|---|---|---|---|
| 4,069,182 | 1/1978 | McDonald | 404/74 |
| 4,085,078 | 4/1978 | McDonald | 404/72 |
| 4,381,357 | 4/1983 | von der Wettern et al. | 524/68 |
| 4,430,464 | 2/1984 | Oliver | 524/59 |
| 4,485,201 | 11/1984 | Davis | 524/68 |
| 4,588,634 | 5/1986 | Pagen et al. | 428/283 |
| 4,609,696 | 9/1986 | Wilkes | 524/59 |
| 5,270,361 | 12/1993 | Duong et al. | 524/80 |

*Primary Examiner*—David Brunsman
*Attorney, Agent, or Firm*—Keck, Mahin & Cate

[57] ABSTRACT

A process for preparing a homogenous asphalt composition including the steps of introducing asphalt medium into a reactor vessel; introducing whole tire rubber granules into the asphalt medium to form a mixture of the asphalt medium and the granular whole tire rubber; circulating a portion the mixture into a bottom portion of the reactor vessel through jet spray nozzles; and recirculating the mixture at 500° F. through the vessel until the whole tire rubber is completely integrated into the asphalt medium and a stable, homogeneous asphalt composition is formed. The incorporated asphalt composition preferably includes about 10–20% whole tire rubber and about 80–90% asphalt medium.

9 Claims, 1 Drawing Sheet

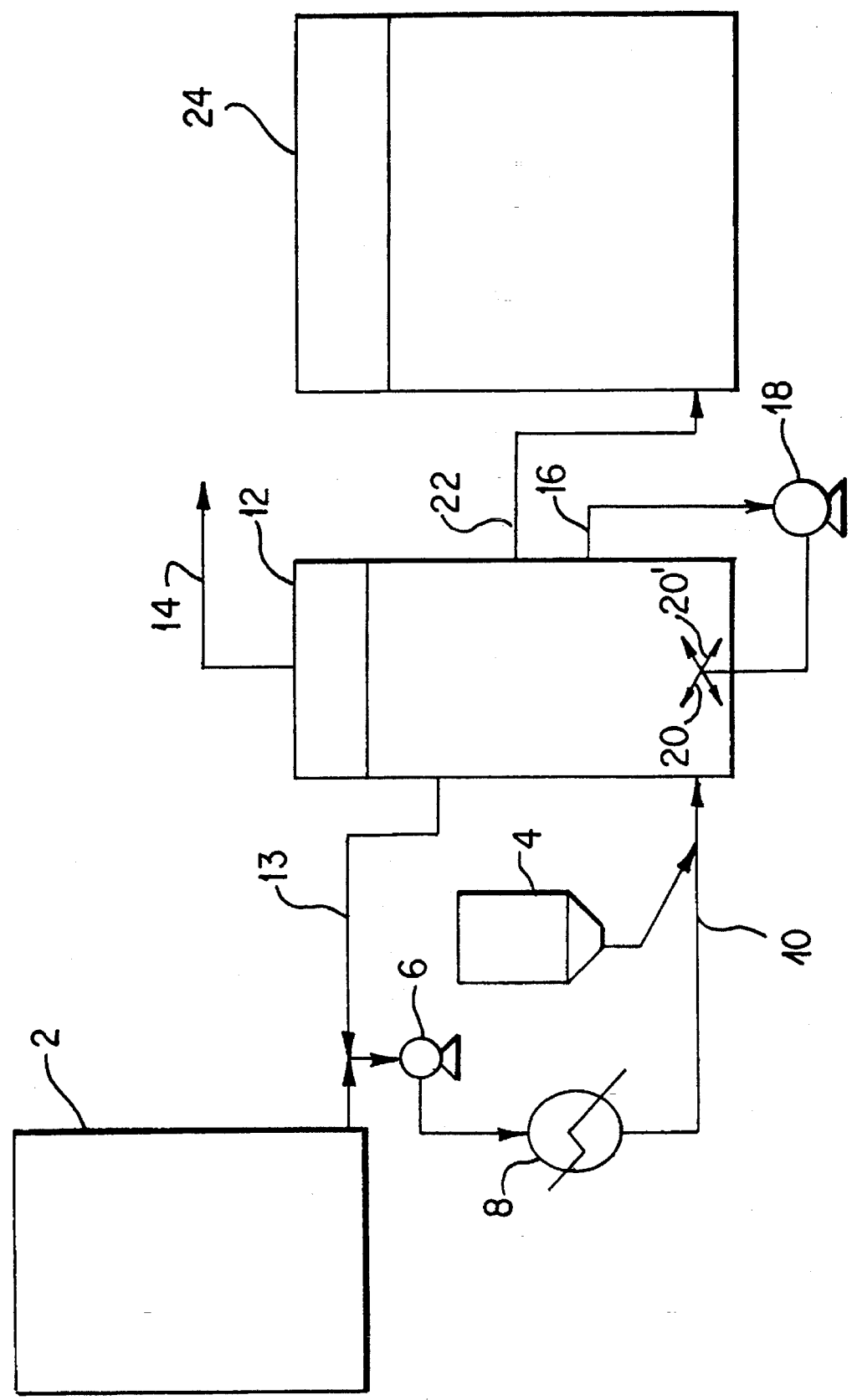

5,492,561

PROCESS FOR LIQUEFYING TIRE RUBBER AND PRODUCT THEREOF

FIELD OF THE INVENTION

A process for liquefying whole tire rubber by incorporation into an asphalt medium to obtain a fully incorporated, homogeneous, stable composition, without oxidation or air-blowing, and a product of the process.

BACKGROUND OF THE INVENTION

Processes for incorporating ground tire rubber into bituminous material to make asphalt cement systems suitable for paving, roofing and other uses have hitherto been unduly complex and thus costly in use. Known processes use additional constituents of the composition and additional process steps in an attempt to provide a homogenous system. Such attempts have not been successful.

Applicant's prior patent applications have been directed to air blown compositions of ground tire rubber and distillation tower bottoms. In these processes, some of the aromatic oils are lost due to dehydrogenation resulting in an oxidized product which, while fully integrated, is more suitable for applications requiring roofing grade material than for applications requiring paving grade asphaltic material.

Duong et al., U.S. Pat. No. 5,270,361, is directed to a process for making an asphalt composition which includes synthetic or natural rubber which may be in particles of up to one-half inch in thickness. Elemental selenium or an organo-selenium compound is added into the mixture to act as a substitute for the sulfur which is removed during the vulcanization process. The selenium or organo-selenium compound acts as a cross-linking agent. The composition is treated with pressurized air in a dehydrogenation reaction. In the dehydrogenation vessel, the dispersing device includes a pair of discs turning at 3600 rpm which promotes homogenization and acceleration of the dehydrogenation reaction. Elemental selenium or an organo-selenium compound is added into the homogenized composition and mixed in a static mixer. The asphalt composition is then recovered and stored in a container at about 150° to 175° C.

Wilkes, U.S. Pat. No. 4,609,696, describes a rubberized asphalt composition which is made by combining asphalt with a hydrocarbon oil to provide a homogenized asphalt-oil mixture or solution, combining the mixture with particulate rubber to provide a homogenous gel and emulsifying the gel by passing the asphalt-rubber-oil gel, with water, through a colloid mill.

Oliver, U.S. Pat. No. 4,430,464, describes a pavement binder composition in which rubber particles are digested in a bituminous material.

Pagen et al., U.S. Pat. No. 4,588,634 describes a roofing material using bitumen and ground tire rubber together with mineral stabilizer and an elastomeric polymer composition.

Rouse, U.S. Pat. No. 5,334,641, describes a rubber modified asphalt for use as a paving compound which is formed by reacting ground rubber, of 50 mesh or finer, with paving grade asphalt and mixing the combination at 300°–400° F. The mixture reacts fully within 25 minutes or less to form a freely pouring mixture and can be held at normal asphalt working temperatures for at least 96 hours without degradation.

Davis, U.S. Pat. No. 4,485,201, describes a method of modifying asphalt with a mixture of ground rubber and synthetic rubber. The compositions include oils and antioxidants in addition to asphalt and rubber. The processing takes place below 375° F.

McDonald, U.S. Pat. No. 4,085,078, describes a paving material formed by heating a mixture of paving grade asphalt and a non-oil resistant rubber to a temperature of about 360° F. to 500° F. The asphalt rubber mixture is diluted with a diluent prior to reaction to form a gelled reaction product. McDonald, U.S. Pat. No. 4,069,182, also describes a hot gelled composition which can be applied to cracked or distressed pavements to repair such pavements. McDonald, U.S. Pat. No. 3,891,585, describes a similar hot gelled composition for repairing pavements.

Winters et al., U.S. Pat. No. 3,919,148, describes an elastomeric paving material prepared from asphalt, rubber and an asphalt solvent to form a hot, thick, viscous, gelled composition.

None of these prior art disclosures describe a process for incorporating whole tire rubber into an asphalt medium, without oxidation or air blowing, as described below.

SUMMARY OF THE INVENTION

The process for liquefying tire rubber fully incorporates ground tire rubber into an asphalt medium to provide a smooth product without degradation or destruction of the asphalt medium. Any asphalt cement or asphalt flux may be used as the process is not dependent on the type of asphalt medium used. In the process, agitation, temperature and time provide the necessary conditions to dissolve and absorb the tire rubber into the asphalt medium, completely, to provide a smooth product. The agitation and temperature remain constant whether the asphalt medium is hard or soft, with a high viscosity or a low viscosity, or whether the asphalt medium contains high or low levels of aromatic oils. The only variation is in the time taken to totally incorporate the tire rubber to provide a smooth product in which the tire rubber is completely incorporated in a smooth mixture. Ground tire rubber loadings up to 20% have been successfully incorporated into the asphalt medium. Preferred levels of ground tire rubber are from 10%–15%. The ground tire rubber particles incorporated into the asphalt medium are typically of 10–30 mesh. Asphalt grade and size of rubber particles are determined by the end use for the product.

It is an object of the invention to provide a process for incorporating whole tire rubber into an asphalt medium without oxidation or air blowing and without substantial distillation of the asphalt medium.

It is another object of the invention to provide a product of such a process.

BRIEF DESCRIPTION OF THE DRAWING

The Figure illustrates, schematically, apparatus useful in a process of the invention.

DETAILED DESCRIPTION OF THE PREFERRED EMBODIMENTS

The invention unexpectedly provides a two-component composition in which whole tire rubber is incorporated into an asphalt medium, without air blowing or oxidation and without substantial distillation of the asphalt medium, to provide a composition in which there are no visible signs of tire rubber. The process is not dependent on the type of asphalt medium used. Particles of rubber cannot be seen in the product even when viewed under a microscope. The whole tire rubber granules are fully incorporated into the asphalt medium.

The two-component composition produced is simple and economical to prepare. According to the process of the invention, the whole tire rubber is incorporated into the asphalt medium by simulating a "boiling action" in the asphalt medium which allows the tire rubber to be absorbed into the asphalt medium at about 500° F. Below about 485°–490° F. there is insufficient blending, while above about 510° F., the temperature may be too close to the flash point of the liquid. A temperature of about 500° F. is the safest temperature to use that is high enough to provide full incorporation of whole tire rubber granules into the asphalt medium but not so high that the process becomes unsafe. The resulting composition is stable and does not separate out. No additives need to be used. The asphalt composition has many uses, such as in the roofing or paving industries.

The Figure illustrates schematically a process of the invention, which is a batch process. Asphalt medium is stored in vessel 2 at a temperature of about 350° F. and whole tire rubber granules are stored in vessel 4 at ambient temperature. Asphalt medium from vessel 2 is charged through pump 6 and heat exchanger 8, where it gains temperature to about 400°–500° F., through pipeline 10 into reactor vessel 12. If the temperature of the asphalt medium in reactor vessel 12 is substantially below 500° F., the asphalt medium may be recirculated through pipeline 13, through pump 6 and through heat exchanger 8 to raise the temperature to or close to 500° F. before being returned to reactor vessel 12. Reactor vessel 12 has a top exit 14 for removal of excess gaseous hydrocarbons and other gaseous vapors, such as $H_2S$, which are disposed of, for example, by incineration at a temperature of about 1350° F.

Whole tire rubber granules are fed pneumatically from storage vessel 4 into pipeline 10 which is carrying the asphalt medium from heat exchanger 8 to reactor vessel 12. The whole tire rubber granules mix with and become wetted by the heated asphalt medium in pipeline 10 before being discharged into reactor vessel 12. When discharge of the complete batch of asphalt medium and whole tire rubber into reactor vessel 12 is complete and a temperature of 500° F. is achieved, circulation of the mixture in reactor vessel 12 is started. The mixture of asphalt and whole tire rubber is circulated from about the middle of reactor vessel 12 through pipeline 16 and pump 18, which may be a 450–600 gallon per minute pump, back into reactor vessel 12 through dual port jet spray nozzles 20, 20' into the bottom of reactor vessel 12. Circulation is continued at 500° F. until the whole tire rubber is completely integrated into the asphalt medium. The temperature in reactor vessel 12 is maintained by use of a fire tube burner (not shown) in the reactor vessel which maintains the temperature of the mixture in the reactor vessel so that circulation through the heat exchanger is not needed during the incorporation process. The finished product is pumped through pipeline 22 into holding vessel 24 before being blended, oxidized, polymer modified or shipped as is.

In a preferred embodiment, the dual port jet spray nozzles 20, 20' are two fixed jetting nozzles 20, 20' which face away from each other at an angle of 180° and which are each angled downwardly at 45° to promote mixing throughout the mixture in reactor vessel 12. In a non-limiting example, nozzles 20, 20' may each be formed from a 6" pipe in which the opening is tapered to a 1.5" opening.

Using such an arrangement, intimate mixing of the whole tire rubber granules and the asphalt medium is achieved while simulating a boiling action in the liquid mixture in the reactor vessel. The jet spray nozzles provide a propulsion spray of the liquid mixture within the body of the liquid mixture in the reactor vessel which promotes turbulence, increases pressure and simulates a boiling action in the liquid mixture. Other arrangements of nozzles which achieve this effect may be used. While the preferred example illustrated in the Figure shows two stationary nozzles, rotating nozzles or a different number or arrangement of nozzles may be used to achieve turbulence. The turbulence created allows the mixture to move upwardly through the reactor vessel. The incorporated product is lighter than the unincorporated or less incorporated mixture and tends to rise through the reactor vessel. Thus, when the mixture is pulled from about the middle of reactor vessel 12 for circulation through pipeline 16 and pump 18, the mixture circulated tends to be less incorporated than the mixture at the top of the reactor vessel, and during recirculation of this less incorporated mixture, is recirculated and the tire rubber granules are further softened in the turbulent environment and integrated into the asphalt medium until the samples obtained show a completely incorporated product.

The pump which generates the liquid flow through the nozzles may, in non-limiting example, be a 400 gallon per minute pump. The effect of the recirculation is to provide suction of the mixture from the middle portion of the reactor vessel and discharge of the mixture into the bottom portion of the reactor vessel.

Advantages of the claimed process include simulating the boiling action in the vessel without excess distillation of the asphalt medium, and fully incorporating the whole tire rubber into the asphalt medium while the finished product is still "virgin", i.e. non-oxidized or air blown. Further, the finished product has a low viscosity and soft physical characteristics. When the product is modified with a polymer concentrate, it is still easily handled. The product is suitable for use in both the paving and roofing industries for forming paving and roofing grade asphalt cements, for modifying with polymers for both paving grade and roofing grade asphalt applications, for oxidizing to provide roofing grade products, and for processing for pipe coating applications, under-coatings, weather proofing membranes and other industrial applications.

Throughput of the process may be 200 to 300 tons per day 15,000–25,000 gallons per batch) using one reactor vessel. The examples describe preferred embodiments.

In a preferred embodiment, 10–15% whole tire rubber of 10–30 mesh was used and blended with 85–90% asphalt medium at 500° F. When the simulated boiling action of the asphalt medium is carried out at 500° F., the whole tire rubber is fully incorporated into the asphalt medium.

While the process which takes place is not entirely clear, it is believed that the jetting process creates the necessary turbulence and pressure environment that softens and saturates the molecular bonds in the tire rubber and allows the tire rubber to be completely consumed into the asphalt when the temperature is maintained at about 500° F. There is some devulcanization of the rubber as $H_2S$ is present in the exhaust through exit 14 from vessel 12 which is incinerated.

The process fully incorporates the whole tire rubber granules into the asphalt cement without degradation and destruction of the base asphalt medium. The process may be used with many different types of asphalt cement or asphalt flux. Typical asphalts, which are non-limiting examples, have the characteristics shown below:

|  | AC-20 | AC-5 | Asphalt flux | ASTM # |
|---|---|---|---|---|
| Orig. visc. at 140° F. in poise | 1725 | 568 | 40 | ASTM D2171 |
| Penetration at 77° F. 100 g. 5 sec. dmm | 57 | 153 | 300+ | ASTM D5 |
| Softening point °F. | 118 | 104 | 65 | ASTM D36 |
| Flash point °F. (COC) | 585 | 588 | 565 | ASTM D92 |
| Ductility at 39.2° F. 5 cm/min. cm | 0 | 5.5 | 15 | ASTM D113 |

Any asphalt medium may be used, the variation being the time taken to totally incorporate the tire rubber into the asphalt medium. Whole tire rubber loading up to 20% have been successfully incorporated into the asphalt base medium. Preferred levels are 10–15% whole tire rubber incorporated into 85–90% asphalt medium.

Example 1

In a lab process chamber, in which a pump is included to circulate the liquid material and the two discharge nozzles point downwardly at 45° to provide a propulsion spray of liquid within the liquid phase of the reactor vessel, suction is from the bottom of the chamber and discharge is through to the top, 6 ins. below the liquid level in the chamber. The asphalt medium and whole tire rubber were blended together prior to sealing the chamber and heating. After sealing, the material is heated to 500° F. When that temperature is reached, the pump is started and the circulation process which takes place is continued non-stop until the run is finished. The temperature is maintained at 500° F. until the material is singular in composition.

In a test run at 500° F. with 90% Asphalt AC-20 as the asphalt medium and 10% whole tire rubber of 30 mesh size, a 100% fully incorporated product having the following characteristics in comparison with the Asphalt AC-20 starting material was obtained after 3.5 hours.

| Test | Asphalt AC-20 | LTR-03 product |
|---|---|---|
| Orig. visc. at 140° F. | 1725 | 1211 |
| Penetration at 77° F. | 57 | 93 |
| Flash point °F. | 585 | 577 |
| Smoke point °F. | 360 | 355 |
| Ductility at 39.2° F. | 0 | 0 |

The final blend achieved is the tire rubber phase which is a liquid phase and is easily handled and easily modified with polymers, etc.

Example 2

Example 1 was repeated using whole tire rubber of 10–30 mesh size. The back pressure of the circulating pump was 40 psi. A 100% fully incorporated product was obtained after 6.0 hours. The characteristics of the product compared with the asphalt AC-20 were as follows.

| Test | Asphalt AC-20 | LTR-04 product |
|---|---|---|
| Orig. visc. at 140° F. | 1725 | 1511 |
| Penetration at 77° F. | 57 | 79 |
| Flash point °F. | 585 | 581 |
| Smoke point °F. | 360 | 346 |
| Ductility at 39.2° F. | 0 | 0 |

Example 3

Example 1 was repeated to determine the effect of circulation of the material on reaction time to totally incorporate the whole tire rubber. Circulation of the material was slowed down to zero psi back pressure.

A 100% fully incorporated product was obtained after 5.0 hours. The characteristics of the product compared with the Asphalt AC-20 were as follows.

| Test | Asphalt AC-20 | LTR-05 product |
|---|---|---|
| Orig. visc. at 140° F. | 1725 | 1235 |
| Penetration at 77° F. | 57 | 89 |
| Flash point °F. | 585 | 568 |
| Smoke point °F. | 360 | 360 |
| Ductility at 39.2° F. | 0 | 0 |
| Softening point °F. | 118 | 108 |

Example 4

Example 1 was repeated to further determine the effect of circulation of the material on reaction time to totally incorporate the whole tire rubber. Circulation of the material was carried out for 2 minutes every hour only.

A 100% fully incorporated product was obtained after 9.0 hours. The characteristics of the product compared with the asphalt AC-20 were as follows.

| Test | Asphalt AC-20 | LTR-06 product |
|---|---|---|
| Orig. visc. at 140° F. | 1725 | 1335 |
| Penetration at 77° F. | 57 | 81 |
| Flash point °F. | 585 | 573 |
| Smoke point °F. | 360 | 358 |
| Ductility at 39.2° F. | 0 | 0 |
| Softening point °F. | 118 | 110 |

Using different grades of asphalt medium, the following examples were carried out.

Example 5

In a further lab test, 90% asphalt AC-5 was used with 10% tire rubber particles (20 mesh). 5650.2 grams AC-5 was heated to 350° F. and poured into a lab size reactor. The 627.8 grams rubber particles were added to the AC-5 material and stirred for about 10–15 seconds to wet the tire rubber particles. The reactor was sealed and the blend was heated to 500° F.

Liquid circulation was started at 400° F. The mixture in the reactor vessel was circulated by pulling mixture from the middle of the reactor vessel and discharging it into the bottom of the reactor vessel through two jet nozzles arranged to inject the liquid mixture in opposite directions into the liquid already in the reactor vessel, causing turbulence in the mixture. Circulation was continued until the tire rubber particles were completely incorporated into the asphalt medium.

Samples were pulled from the reactor vessel every hour. The physical appearance was visually inspected by smearing a small amount of liquid on a glass plate to determine the smoothness rating of the mixture. The process was completed when 100% incorporation or smoothness was achieved. Once smoothness was achieved, the sample was drained into a container and the physical properties were tested. In this example, the complete process took 6.0 hours.

| Test | Product | ASTM Method |
|---|---|---|
| Viscosity @ 140° F., poise | 534 | ASTM D2171 |
| Penetration @ 77° F. 100 g, 5 sec, dmm | 182 | ASTM D5 |
| Softening Point °F. | 107 | ASTM D36 |
| Flash Point °F., COC | 565 | ASTM D92 |
| Ductility @ 39.2° F. 5 cm/min, cm | 42.5 | ASTM D113 |

Example 6

A plant run was carried out using a mixture of 127,000 pounds (15,000 gallons) of AC-5 asphalt medium together with 14,166 pounds of tire rubber particles (20 mesh). The mixture was in the proportion of 90% asphalt medium to 10% tire rubber particles. The asphalt material was heated to 350° F. in the asphalt storage tank and then transferred from the storage tank into the reactor vessel, via the heat exchanger. The temperature of the asphalt medium reaching the reactor vessel was 405° F. The asphalt medium was circulated through the heat exchanger again to increase the asphalt temperature to 500° F. While the asphalt medium was circulating, the tire rubber particles were added to the asphalt medium by pneumatically injecting the tire rubber parties directly into the asphalt stream on the discharge side of the pump, before entering the reactor vessel. This wetted the rubber particles with the asphalt medium. After the tire rubber particles were added into the mixture, the circulation process began. A positive displacement pump of 450 gpm capacity pulled the mixture from the middle level of the liquid in the reactor vessel and discharged it back into the bottom of the reactor vessel through two jet nozzles. The openings are directed in opposite directions, preferably but not necessarily at a 45° downward angle. The jet nozzles propel the liquid mixture in the nozzles into the liquid mixture in the reactor vessel to promote turbulence and facilitate incorporation of the tire rubber particles into the asphalt medium. Other arrangements of jet nozzles may be used to achieve the same result. The circulation was continued and the temperature maintained at 500° F. until the tire rubber particles were totally incorporated into the asphalt base.

Samples were pulled from the reactor vessel every hour and the physical appearance was visually inspected by smearing a small amount of liquid on a glass plate to determine the smoothness rating of the mixture. Once 100% smoothness was achieved, the physical properties were tested. The complete process took 10.0 hours. The product had the following properties:

| Test | Product | ASTM Method |
|---|---|---|
| Viscosity @ 140° F., poise | 559 | ASTM D2171 |
| Penetration @ 77° F. 100 g, 5 sec, dmm | 189 | ASTM D5 |
| Softening Point °F. | 103 | ASTM D36 |
| Flash Point °F., COC | 560 | ASTM D92 |
| Ductility @ 39.2° F. 5 cm/min, cm | 45.5 | ASTM D113 |

Example 7

In another laboratory run, 10% ground tire rubber granules (20 mesh) were mixed with 90% asphalt medium (AC-20) in the proportion of 606.1 g ground tire rubber to 5454.5 g asphalt medium. The asphalt medium was heated to 350° F. and the heated asphalt medium poured into the lab size reactor. The ground tire rubber was added to the AC-20 asphalt medium and stirred for approximately 10–15 seconds to wet the tire rubber particles. The reactor was sealed and the blend heated to 500° F. Liquid circulation was started at 400° F. The circulated mixture was pulled from a middle portion of the reactor vessel and discharged into the bottom portion of the reactor vessel through two jet nozzles that disperse the liquid medium in opposite directions causing turbulence in the mixture. The circulation was continued until the ground tire rubber was completely incorporated into the asphalt medium. Samples were taken from the reactor vessel every hour and the physical appearance was visually inspected by smearing a small amount of liquid on a glass plate to determine the smoothness rating of the mixture. When smoothness was achieved, the contents of the reactor vessel were drained and the physical properties of the product were tested. The complete process took 9.0 hours. The results obtained were as follows:

| Test | Product | ASTM Method |
|---|---|---|
| Viscosity @ 140° F., poise | 1335 | ASTM D2171 |
| Penetration @ 77° F. 100 g, 5 sec, dmm | 92 | ASTM D5 |
| Softening Point °F. | 117 | ASTM D36 |
| Flash Point °F., COC | 580 | ASTM D92 |
| Ductility @ 39.2° F. 5 cm/min, cm | 4.5 | ASTM D113 |

Example 8

In a further laboratory run, 15% ground tire rubber granules of 10 mesh (550 g) were mixed with 85% asphalt medium AC-5 (3116.8 g). The method of Example 7 was repeated. Smoothness was achieved after 6.0 hours. The product had the following characteristics:

| Test | Product | ASTM Method |
|---|---|---|
| Viscosity @ 140° F., poise | 482 | ASTM D2171 |
| Penetration @ 77° F. 100 g, 5 sec, dmm | 208 | ASTM D5 |
| Softening Point °F. | 99 | ASTM D36 |
| Flash Point °F., COC | 560 | ASTM D92 |
| Ductility @ 39.2° F. 5 cm/min, cm | 44 | ASTM D113 |

Example 9

In a further laboratory run, 20% ground tire rubber granules of 10–30 mesh (1130.2 g) was mixed with 80% asphalt flux (4520.8 g). The method of Example 7 was repeated. Smoothness was achieved after 4.0 hours. The product had the following characteristics:

| Test | Product | ASTM Method |
|---|---|---|
| Viscosity @ 140° F., poise | 113 | ASTM D2171 |
| Penetration @ 77° F. 100 g, 5 sec, dmm | 300+ | ASTM D5 |
| Softening Point °F. | 73 | ASTM D36 |
| Flash Point °F., COC | 580 | ASTM D92 |
| Ductility @ 39.2° F. 5 cm/min, cm | 100+ | ASTM D113 |

While the invention has been described above with respect to certain embodiments thereof, it will be appreciated by one skilled in the art that variations and modifications may be made without departing from the spirit and scope of the invention.

What is claimed is:

1. A process for preparing a fully incorporated asphalt composition comprising:

introducing asphalt medium into a reactor vessel;

introducing whole tire rubber granules into the asphalt medium to form a mixture of the asphalt medium and the whole tire rubber granules;

circulating part of the mixture from a middle portion of the reactor vessel into a bottom portion of the reactor vessel through jet spray nozzles until the whole tire rubber granules are completely integrated into the asphalt medium; and forming a stable, fully incorporated asphalt composition.

2. A process according to claim 1 further comprising circulating the asphalt medium from the reactor vessel through a heat exchanger to increase temperature of the asphalt medium to about 500° F.

3. A process according to claim 1 comprising maintaining the temperature in the reactor vessel at about 485°–510° F.

4. A process according to claim 1 comprising mixing about 10–20% whole tire rubber particles into about 80–90% asphalt medium.

5. A process according to claim 1 comprising mixing in the reactor vessel for about 5 to 10 hours.

6. A process according to claim 1 wherein the whole tire rubber comprises at least one rubber material selected from natural rubber and synthetic rubber.

7. A process according to claim 1 comprising modifying the asphalt composition by blending polymer material therein.

8. A process according to claim 1 further comprising pumping the formed asphalt composition into a holding vessel.

9. A process for preparing a fully incorporated asphalt composition comprising:

introducing asphalt medium into a reactor vessel;

introducing whole tire rubber granules into the asphalt medium to form a mixture of 10–20% whole tire rubber granules and 80–90% asphalt medium;

circulating part of the mixture at a temperature of about 485°–510° F. from a middle portion of the reactor vessel into a bottom portion of the reactor vessel through two jet spray nozzles which discharge the mixture in opposite directions until the whole tire rubber granules are completely integrated into the asphalt medium; and forming a stable, fully incorporated asphalt composition.

* * * * *